United States Patent [19]

Keitaro

[11] Patent Number: 4,520,919

[45] Date of Patent: Jun. 4, 1985

[54] WORK-CLAMP PALLET FOR MACHINE TOOL

[75] Inventor: Yonezawa Keitaro, Itamishi, Japan

[73] Assignee: Aioi Seiki Kabushiki Kaisha, Itamishi, Japan

[21] Appl. No.: 397,246

[22] Filed: Jul. 12, 1982

[30] Foreign Application Priority Data

Jul. 21, 1981 [JP] Japan .................... 56-108998[U]

[51] Int. Cl.$^3$ ............................................. B65G 49/00
[52] U.S. Cl. .................... 198/648; 198/694; 29/568; 91/1; 269/25
[58] Field of Search ............... 198/345, 472, 648, 339, 198/694; 29/33 P, 563, 568; 269/25, 30, 137, 138, 20; 414/749, 750; 91/1, 534, 536

[56] References Cited

U.S. PATENT DOCUMENTS

| | | | |
|---|---|---|---|
| 2,448,852 | 9/1948 | Aamot | 91/536 |
| 3,464,203 | 9/1969 | Twersky | 91/1 |
| 3,658,315 | 4/1972 | Boucherie | 198/694 |
| 3,825,245 | 7/1974 | Osburn et al. | 198/472 |
| 3,830,485 | 8/1974 | Mickelsson et al. | 269/25 |
| 3,899,162 | 8/1975 | Fischer | 269/25 |
| 4,090,287 | 5/1978 | Selander | 29/568 |
| 4,179,106 | 12/1979 | Bergman | 269/20 |
| 4,257,513 | 3/1981 | Siarto | 198/345 |
| 4,275,983 | 6/1981 | Bergman | 198/345 |
| 4,373,840 | 2/1983 | Miller, Jr. | 198/339 |
| 4,380,939 | 4/1983 | Gardner | 269/20 |
| 4,423,664 | 1/1984 | Buchl | 91/1 |
| 4,445,675 | 5/1984 | Kitaura | 269/20 |

FOREIGN PATENT DOCUMENTS

| | | | |
|---|---|---|---|
| 1431750 | 7/1969 | Fed. Rep. of Germany | 91/534 |
| 2138626 | 2/1972 | Fed. Rep. of Germany | 91/1 |
| 2414880 | 10/1974 | Fed. Rep. of Germany | 198/648 |
| 3232367 | 3/1984 | Fed. Rep. of Germany | 269/20 |
| 1039553 | 10/1953 | France | 269/138 |
| 342818 | 1/1960 | Switzerland | 91/1 |
| 614954 | 12/1948 | United Kingdom | 269/138 |
| 1202997 | 8/1970 | United Kingdom | 91/536 |

Primary Examiner—Joseph E. Valenza
Assistant Examiner—Daniel R. Alexander
Attorney, Agent, or Firm—Bacon & Thomas

[57] ABSTRACT

A work-clamp pallet of the exchangeable type for facilitating changing of works and intended for use with a machine tool of either the vertical or horizontal type with its base block provided with a plurality of hydraulic clamping devices and also with a special shut-off valve for shutting down its oil path. It is so arranged that its oil path may be shut down after supplying the hydraulic clamping devices with a set level of hydraulic pressure. This hydraulic pressure is maintained for a long time without any supplementary feeding of hydraulic pressure for the clamping devices to be kept in the clamping condition. When this work-clamp pallet is used, it is possible to change workpieces on the work-clamp pallet at a work-changing station outside the work table of the machine tool. The work-clamp pallet with workpieces clamped in position can then be transferred onto the machine tool to carry out the machining operations.

15 Claims, 42 Drawing Figures

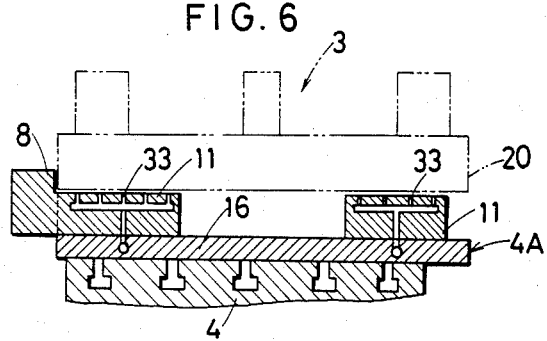
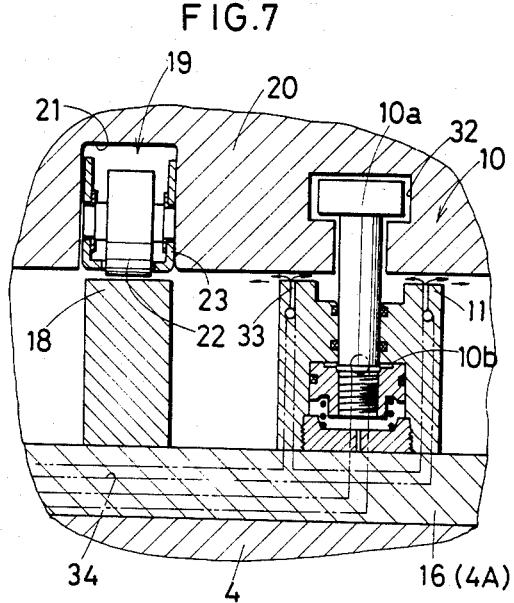
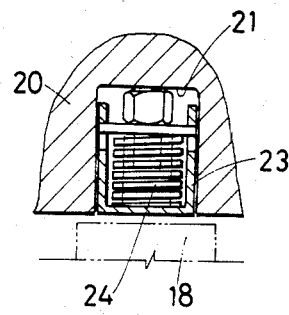

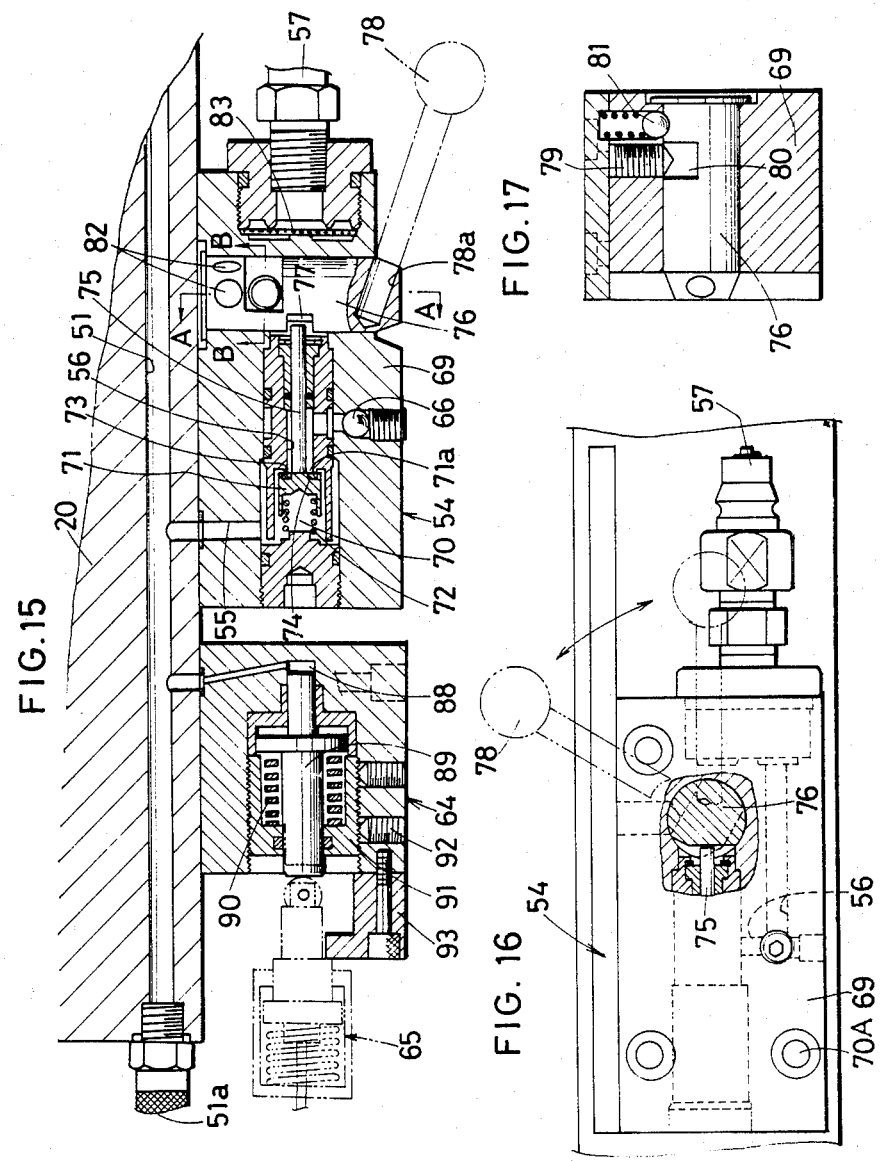

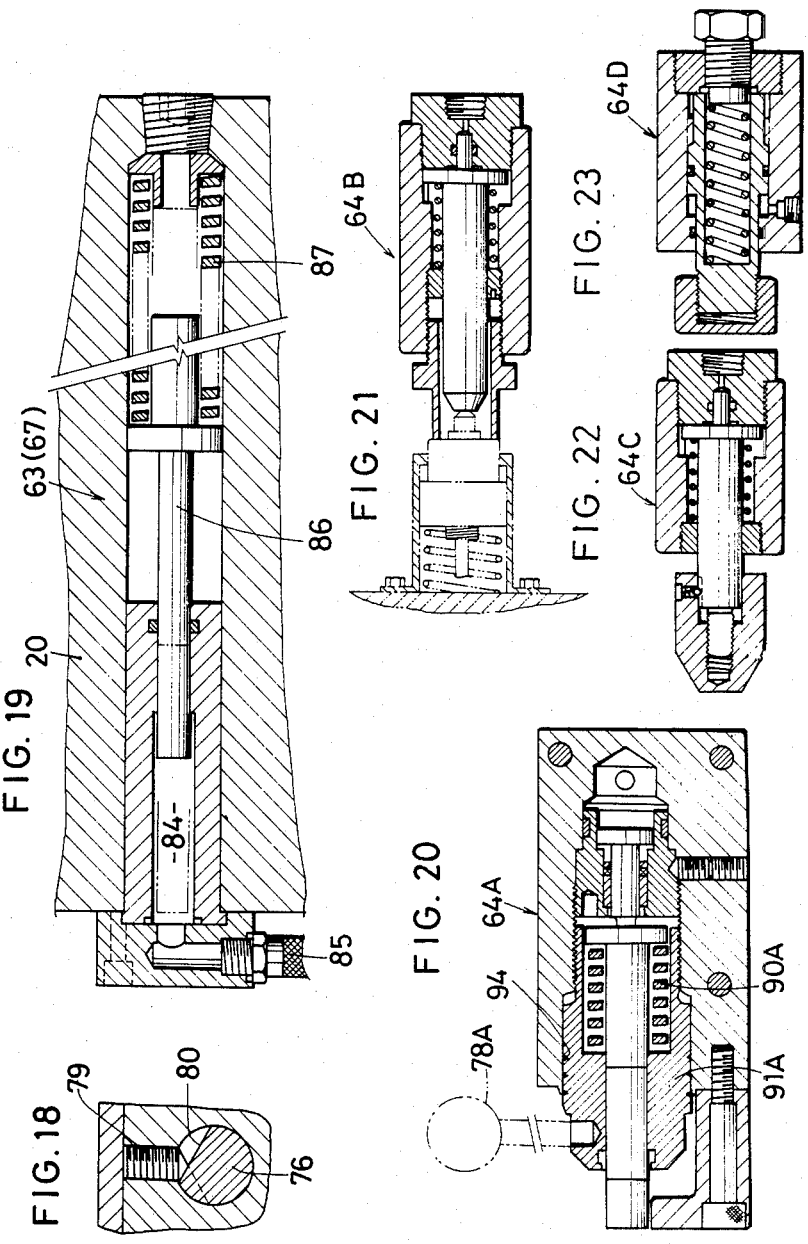

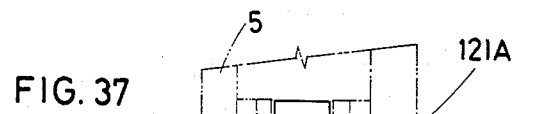
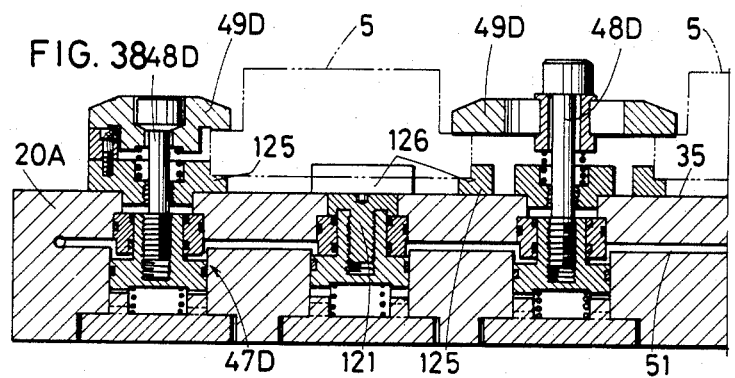
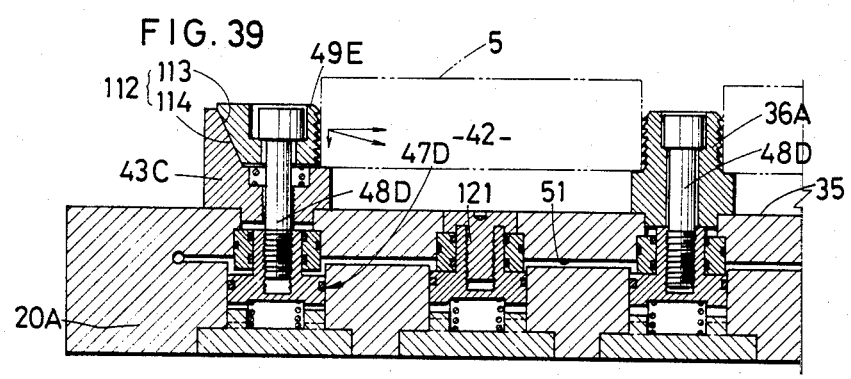

WORK-CLAMP PALLET FOR MACHINE TOOL

BACKGROUND OF THE INVENTION

1. Field of the Invention

The present invention relates to work-clamp pallets for various machine tools of the vertical or the horizontal type, especially those for NC machine tools of the vertical or the horizontal type.

2. Description of the Prior Art

For machining on a machine tool, work pieces are required to be precisely positioned on a work table and subsequently clamped securely thereto.

Especially in the case of an NC machine tool, no truly precise machining of work pieces can be accomplished unless they are position precisely.

While in recent years there has been remarkable progress in performance of NC machine tools such as cutting speed, the variety and performance of cutting tools and the automatic changing of cutting tools, resulting in a marked improvement of their working efficiency. However, there is still much to be desired about the improving the means for changing work pieces since this has been a major bottle-neck in the desired improvement of their working efficiency and productivity.

Hitherto, in a vertical machine tool it has been a usual practice to provide T-sectioned grooves in a work-clamping face of a work table and to position one or more workpieces directly on the work table. After subsequent clamping of the positioned workpieces by means of bolts or small clamping devices, the position of each workpiece is checked by actual measurement. In many cases it is necessary to adjust and re-clamp each workpiece before proceeding with the machining thereof.

According to this conventional practice, however, the machine tool has to be stopped while the finished workpieces are removed and new workpieces for the next cycle of machining are set on the work table. Hence, even with a modern NC machine tool, the net working rate is then 30-40% at the best, the remaining 60-70% of the working hours are lost in preparatory work such as changing workpieces and cleaning the machine for removal of chips.

For improving the efficiency of the work-changing procedure, therefore, studies have been made of various clamping means and methods of placing them properly arranged on the work table.

For instance, an attempt was made to have fixedly secured to the topside of the work table a work-clamp base having arranged on it a plurality of hydraulic clamping devices. The hydraulic cylinder of each of these clamping devices was connected to a hydraulic pressure supply so that a plurality of workpieces could be clamped quickly.

Since, however, the abovementioned work-clamp base is fixedly secured to the work table of a machine tool, the changing of workpieces is made on the work table also. So, while the method is effective indeed for improving the efficiency of the work-changing procedure, very slight improvement is made in the machine's working efficiency.

For overcoming this problem, the idea was proposed of using a work-clamp pallet which allows changing of workpieces outside the machine tool.

According to the idea, a pallet-changing table is provided in front of a machine tool so as to enable exchange of work-clamp pallets between it and the machine tool's work table. Works are set on a plurality of work-clamp pallets, one at a time, at the work-changing station of the pallet-changing table, each work-clamp pallet so prepared is transferred onto the work table and positioned thereon and clamped thereto to be thus readied for machining of the workpieces set thereon.

When the abovementioned work-clamp pallet, however, problems arise is with the hydraulic clamping devices.

When each work-clamp pallet is transferred with the hydraulic hoses leading from the hydraulic pressure supply device connected thereto, those hoses are required to be long and the multiplicity thereof being entangled interferes with smooth transfer of the pallet.

Moreover, during machining, the work table with the work-clamp pallet clamped thereon moves longitudinally as well as laterally over substantial strokes, hence means have to be provided for reeling the hydraulic hoses in and out lest they interfere with movement of the work table.

Also, if any of the hydraulic hoses should be burnt by the red-hot chips resulting from machining, the resulting leakage of hydraulic oil results in malfunctioning of the clamping devices and, machining must be interrupted for replacing the work-clamp pallet. It is also possible that the leaked hydraulic oil may be ignited to cause a fire which might develop to be a catastrophe involving the entire plant.

In order to cope with the above problem, it is possible to shut off the oil path by a directional changeover valve after feeding hydraulic pressure to the hydraulic clamping devices for clamping the workpieces and thereafter transfer the work-clamp pallet to the NC machine with the hydraulic hoses disconnected.

With a spool valve ordinarily used as such a directional changeover valve, however, perfectly leak-free shutting-off of the hydraulic oil is impossible. Hence, hydraulic pressure leakage from the hydraulic clampine devices is inevitable.

Should a hydraulic pressure leakage occur, the resultant decrease of the clamping force is likely to cause false machining of the workpieces and even if this could be avoided, it is required to interrupt machining for replacing the work-clamp pallet.

This risk can be precluded if the hydraulic hoses are not disconnected after clamping of the work-clamp pallet to the work table, but this is accompanied by the abovementioned problem.

Thus, the idea of providing the work-clamp pallet with hydraulic clamping devices has not yet been put to practical use since it is accompanied by a number of problems or difficulties, and is also expensive.

Providing the work-clamp pallet with mechanical clamping devices using a screw mechanism or the like, on the other hand, is also accompanied by drawbacks.

With a mechanical clamping device miniaturizing is difficult, as is generation of the required clamping force of say several tons. Another problem is that mechanical clamping devices have to be manipulated one after another for clamping as well as unclamping, hence no substantial improvement of the efficiency of work-setting procedure can be obtained.

The work-clamp pallet is put to wider practical use for machining tools of the horizontal type than for the vertical type.

Today many of the latest, large horizontal machining centers are complete with a multi-pallet automatic pallet-changing device for automatic changing of workpieces.

The work-clamp pallet used in this case is box-shaped with work-clamping faces provided on 4 or 2 sides thereof. The clamping device employed therefor has an improved universal feature, for workpieces to be machined in this case are relatively large, and varied in shape.

Each work-clamping face thereof, is provided with a multiplicity of tapped holes and is so designed such that workpieces are clamped to the work-clamping face by a plurality of bolts.

With this type of work-clamp pallet positioning of workpieces on the work-clamping face is not easy, the work-clamping procedure being somewhat troublesome. Hence, it is less suited for clamping small works.

SUMMARY OF THE INVENTION

The present invention is aimed at solving the above-mentioned problems.

A first object of the present invention is to enable positioning of as many workpieces as possible on the work-clamping face of a work-clamp pallet and to achieve powerful clamping thereof with an improved efficiency by providing a work-clamp pallet for a machine tool with small yet powerful hydraulic clamping devices; and also to minimize the frequency of changing of the working rate of the machine tool.

A second object of the invention is to enable transfer of the work-clamp pallet onto the work table after clamping the works thereon by the abovementioned hydraulic clamping devices with the hydraulic hoses leading from the hydraulic pressure supply device disconnected and also to enable machining of works clamped on the work-clamp pallet with no supplementary supply of hydraulic pressure to the work-clamp pallet clamped to the work table of the machine tool.

Therefore, there is provided a special shut-off valve at the beginning of the oil path for supplying hydraulic pressure to and discharging it from the hydraulic cylinder of each hydraulic clamping device.

A third object of the invention is to enable holding the hydraulic pressure at the set level free from any abnormal fall or rise thereof even in the event of leakage of the hydraulic oil in the hydraulic oil system of the work-clamp pallet sealed by the abovementioned shut-off valve and free of any variation of the temperature of the hydraulic oil.

Therefore, the work-clamping pallet is provided with a hydraulic pressure decline preventing device with its hydraulic pressure accumulation connected with the above-mentioned oil path and also with an actuator which comes into play in the event of an abnormal decline of hydraulic pressure to trigger the limit switch on the work table.

The work-clamp pallet according to the invention is made up of a base block, a plurality of hydraulic clamping devices, oil path and shut-off valve, wherein:

the base block whose topside constitutes a work-clamping face on which workpieces are set is provided with a positioning means for positioning thereof on the work table of a machine tool longitudinally as well as laterally, and a clamping means for clamping it to the work table;

each hydraulic clamping device is composed of a hydraulic cylinder secured to the work-clamping face and a clamping block connected to the tip of the piston rod thereof;

the clamping block is arranged so as to be shiftable between a clamping position, where the work is clamped by hydraulic cylinder, and an unclamping position where clamping is released;

the oil path is provided to communicate the working oil chambers of the individual hydraulic cylinders; and, the shut-off valve is secured to the base block with its secondary port connected to the beginning end of the oil path and the hydraulic pressure inlet on the primary port side is disconnectably connected to the hydraulic pressure outlet of the hydraulic pressure supply device so that when, after supplying hydraulic pressure from the hydraulic pressure supply device to the hydraulic oil chamber of the hydraulic cylinder with the hydraulic pressure outlet connected to the hydraulic pressure inlet the former is disconnected from the latter, the oil path is closed by the shut-off valve so that decline of the hydraulic pressure in the hydraulic oil chambers is precluded.

If necessary, a hydraulic pressure decline preventing device is attached to the base block with its hydraulic pressure accumulating room connected so as to communicate with the oil path.

BRIEF DESCRIPTION OF THE DRAWINGS

Of the appended drawings showing the embodiments of the present invention, FIGS. 1–26 relate to the principal embodiment and FIGS. 27–42 alternative embodiments.

FIG. 6 is a sectional view taken along the line VI—VI in FIG. 1 showing another cross-section of the table.

FIG. 7 is a vertical sectional front view of the castor means and a clamping device;

FIG. 8 is a vertical sectional front view showing the spring section of the castor means;

FIG. 15 is a horizontal sectional plan view of a shut-off valve and a hydraulic pressure abnormal decline detection device;

FIG. 16 is the side view of the shut-off valve;

FIG. 17 is a sectional view taken along the line A—A in FIG. 15;

FIG. 18 is a sectional view taken along the line B—B in FIG. 15;

FIG. 19 is a horizontal sectional plan view of a spring-type accumulator;

FIGS. 20-23 are vertical sectional side views showing each one of modified actuators;

FIGS. 34-39 show a sixth alternative embodiment, of which

FIG. 34 is the plan view of the work-clamp pallet;

FIG. 35 is a partial vertical sectional front view of the work-clamp pallet;

FIG. 36 is a view taken from the direction indicated by the arrow D in FIG. 35;

FIG. 37 is a vertical sectional front view showing essential parts of a modified hydraulic clamping device;

FIGS. 38 and 39 are partial vertical sectional side views of the work-clamp pallets provided with each one modified hydraulic clamping device;

DETAILED DESCRIPTION OF THE PREFERRED EMBODIMENTS

Referring to FIGS. 1-26, described below in detail is the principal embodiment of the present invention.

Figure 1:
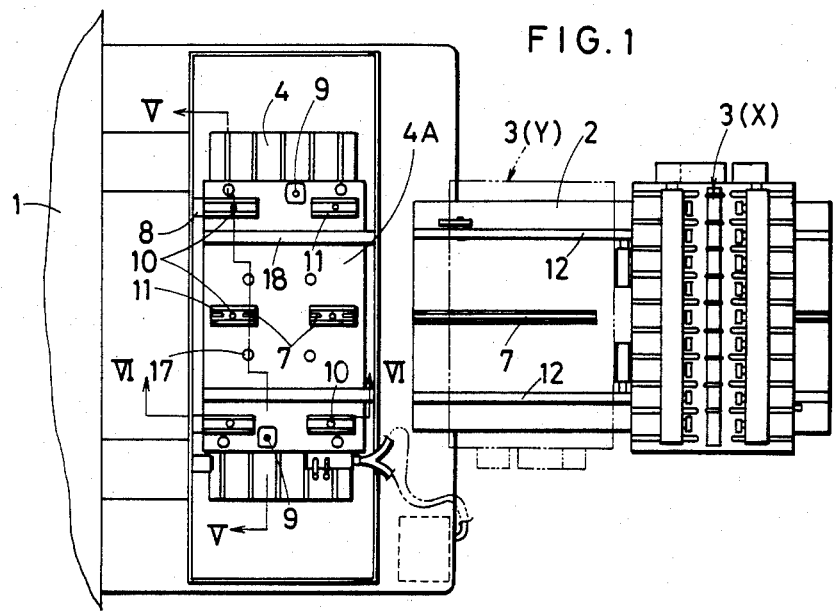
FIG. 1 is the plan view of the work table of a machine tool and a pallet-changing table.
Figure 2:
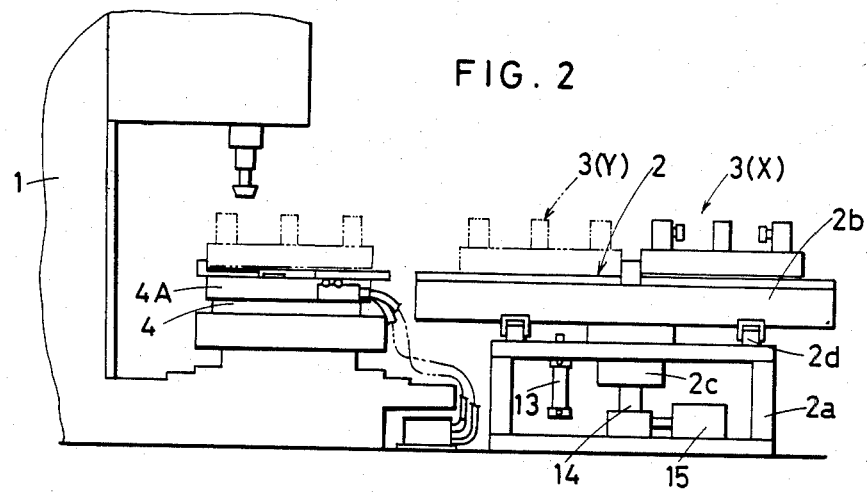
FIG. 2 is the side view of what is shown in FIG. 1.
Figure 3:
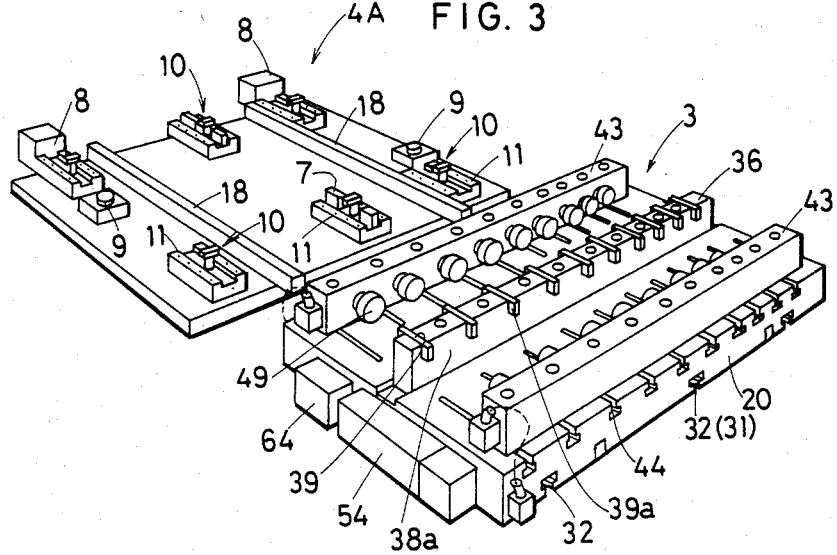
FIG. 3 is a perspective view of an auxiliary table and a work-clamp pallet.

As shown in FIGS. 1-3, a rotary pallet-changing table 2 is placed in front of an NC (numerically controlled) vertical machine tool 1 with spaces thereon for two work-clamp pallets.

On a movable work table 4 of the machine tool 1 is fixedly secured thereto an auxiliary table 4A on which the work-clamp pallet 3 is positioned and clamped. It is arranged so that the work-clamp pallets 3 can be exchanged between the pallet-changing table 2 and this auxiliary table 4A.

At a work-changing station X on the pallet-changing table 2 a multiplicity of workpieces 5 are positioned on the work-clamp pallet 3 with a high precision and each is clamped by a hydraulic clamping device. The pallet-changing table 2 is then rotated horizontally by half a turn before the work-clamp pallet 3 is transferred to a work-clamp pallet changing station Y.

Next, the work-clamp pallet 3 is transferred from the work-clamp pallet changing station Y onto the auxiliary table 4A, being guided by a guide means 7. After being stopped by a stopper 8, the work-clamp pallet 3 is positioned by a pair of positioning devices 9 to be subsequently powerfully clamped to supports 11 arranged on the auxiliary table 4A by means of hydraulic clamping devices 10.

By thus positioning the individual workpieces 5 on the work-clamp pallet 3 and then the work-clamp pallet 3 with respect to the table 4 with a high degree of precision, each workpiece 5 can be positioned with respect to the table 4 with an equally high precision.

After completion of the clamping of the work-clamp pallet 3 to the auxiliary table 4A the machine tool 1 is started for machining the workpieces.

While machining is under way, workpieces 5 are set up on another work-clamp pallet 3 at the work-changing station X.

After completion of a cycle of machining, the work-clamp pallet 3 is shifted to the work-clamp pallet changing station Y and the pallet-changing table 2 is again rotated by half a turn for the work-clamp pallet 3 with the finished workpieces 5 thereon to be shifted to the work-changing station X. The work-clamp pallet 3 with new workpieces 5 to be machined is shifted to the work-clamp pallet changing station Y, and the above procedure is repeated for successive changing of the work-clamp pallets.

Now explained briefly are the constructions of the pallet-changing table 2 and the auxiliary table 4A.

The pallet-changing table 2 is composed of a rotary frame 2b supported on castors 2d so as to be horizontally rotatable about a shaft 2c on a base frame 2a. On the topside of a top plate secured to the rotary frame 2b there are set two parallel transfer rails 12 and a single guide rail 7. Reference numeral 13 denotes a rotary locking device, 14 a pivot and 15 an electric motor which is provided as necessary.

The auxiliary table 4A is designed as a unit composed of a rectangular base plate 16 with a number of clamping devices 10 arranged thereon, and is secured to the table 4 by means of bolts 17.

On the base plate 16 are arranged two, left and right, transfer rails 18; a pair of positioning devices 9 equidistantly spaced from the center to the left and right; pairs of clamping devices 10, the pairs located each on the left, right and at the center; the supports 11 arranged on both sides of each clamping device 10; two guide rails 7 each extending longitudinally with a center pair of clamping devices at its center; and a lateral pair of stoppers 8.

Figure 4:
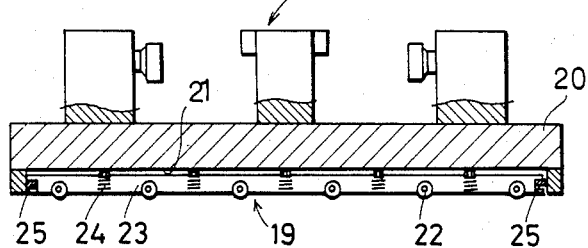
FIG. 4 is a partial vertical sectional side view of the work-clamp pallet showing its castor means.
Figure 5:
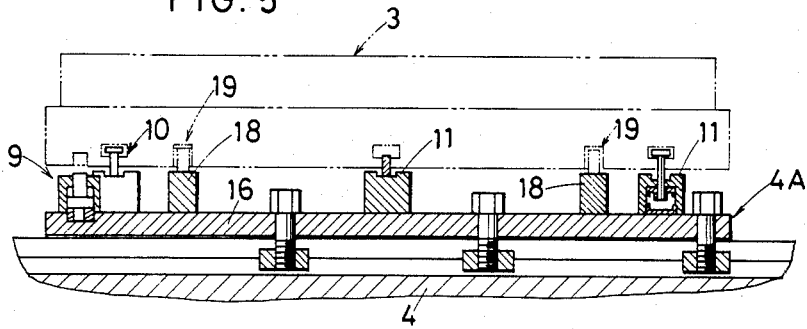
FIG. 5 is a sectional view taken along the line V—V in FIG. 1 showing a cross-section of the auxiliary table.
Figure 9:
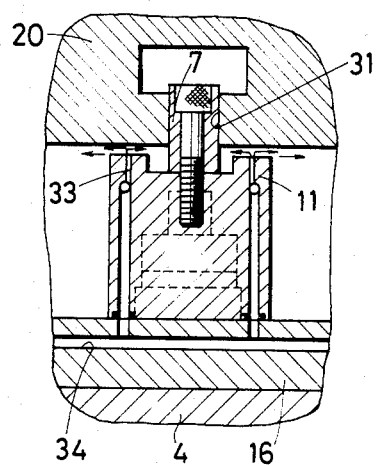
FIG. 9 is a vertical sectional front view of a guide rail.

As shown in FIGS. 4-10, as a traveling support means 19 for the work-clamp pallet 3, there is a square-sectioned groove 21 provided in the underside of the base block 20 U-sectioned members 23 carry one castor 22 each with their vertical positions freely adjustable. U-sectioned member 23 is urged downwardly by a compression spring 24 such that the tread part of the castor 22 alone extends below base block 20. Both end parts of the U-sectioned member 23 are supported by support members 25. (FIGS. 4, 7 and 8)

Figure 10:
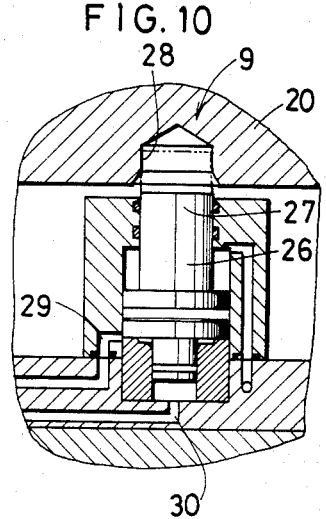
FIG. 10 is a vertical sectional front view of a positioning device.

As seen from FIG. 10, the positioning device 9 consists of a pneumatic cylinder with a plug 27 connected to its piston rod 26. The base block 20 is positioned with high precision as plug 27 engages a mating hold 28 in the underside thereof. Pneumatic pressure is supplied to a working-side port 29 to cause engagement of the plug 27 with the mating hold 28. Working side port 29 communicates with a detection side port 30 for the pneumatic pressure to be supplied to the detection side port 30 so that the engagement of the plug 27 is displayed on a control panel (not shown) etc. As this is known to those having skill in the art, description of any further detail of this phase of the construction is omitted.

As mentioned above, the guide rail 7 slidably fits in the guide groove 31 formed in the underside of the base block 20 as the work-clamp pallet 3 is transferred from the work-clamp pallet changing station Y onto the auxiliary table 4A to prevent the base block 20 from lateral shifting. Further, each clamp arm 10a slides into a clamping groove 32 formed in a T-section in the underside of the base block 20 with the positioning device 9, hydraulic pressure is supplied to the hydraulic oil chamber 10b of the clamping device 10. The clamp arm 10a is pulled down so that the compression spring 24 of the traveling gear 19 is compressed for the tread of the castor 22 to be retracted to be flush with the underside of the base block 20. Base block 20 is thus clamped to the supports 11.

Compressed air blows out of air outlets 33 in the topside of each support 11 to remove any foreign objects deposited on each support 11. This insures close contact of the underside of the base block 20 with the topside of the support 11 through detection of rise of the pneumatic pressure in a compressed air supply channel 34.

The pneumatic pressure from a compressed air source is supplied by known means to a pneumatically-driven hydraulic pump for a hydraulic pressure to be generated and supplied to the clamping device 10 as well as to the positioning device 9 and the air outlets 33 of each support 11.

Upon engagement of the plug 27 of the positioning device 9 in the mating hold 28, pneumatic pressure is supplied to the detection side port 30 and the condition is displayed by lighting of a pneumatic pressure indicator lamp.

As the underside of the base block 20 comes into close contact with the topside of the support 11, the pneumatic pressure in a gushing air supply channel is caused to rise, and this is detected by a means of a pressure switch whose output signal is led to a contact confirmation lamp (not shown) for the contact condition to be indicated thereby.

The auxiliary table 4A may be formed to be fixedly combined with the table 4 but, when, as mentioned above, it is made as an independent or separate unit to be secured to the table 4, it is readily applicable to any existing machine tool.

FIGS. 11–14, describe the base block 20 and the hydraulic clamping device 6 of the work-clamp pallet 3.

This work-clamp pallet 3 is intended for use with a vertical machine tool 1, and its base block 20 is made of a thick, rectangular steel plate, with its topside constituting the work-clamping face 35 for the workpieces to be set thereon.

Figure 11:
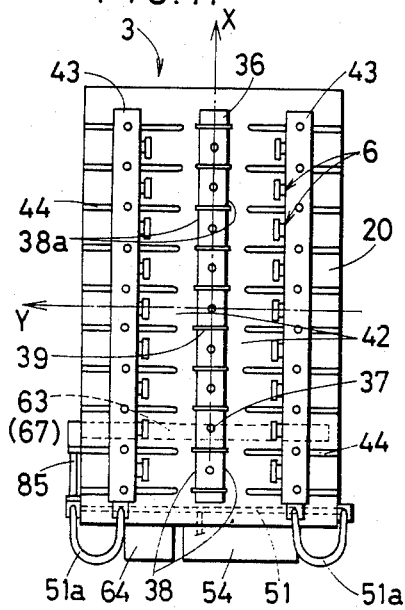
FIG. 11 is the plan view of the work-clamp pallet.
Figure 12:
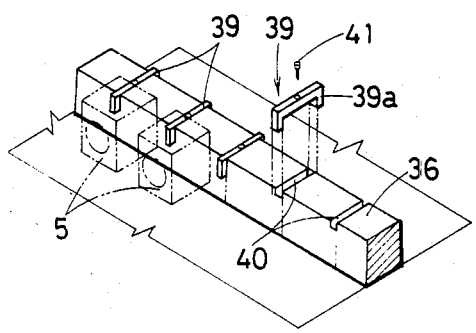
FIG. 12 is a partial perspective view of a standard frame.
Figure 13:
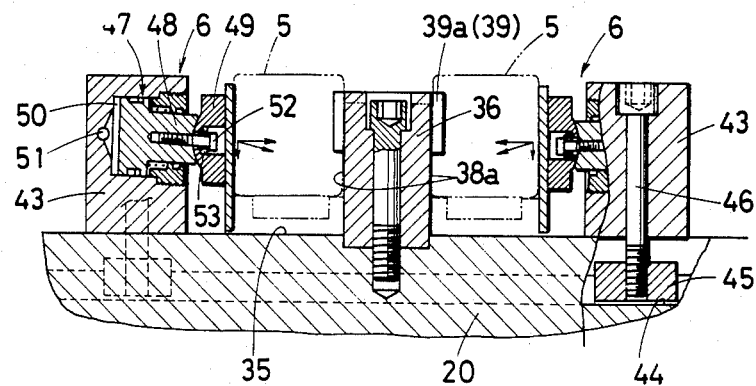
FIG. 13 is an enlarged vertical sectional side view showing essential parts of the clamping device.

With the center of the work-clamping face 35 as the point of origin, X-axis is set laterally, Y-axis longitudinally and Z-axis vertically, as shown in FIG. 11.

A standard frame 36 is the standard for high-precision positioning of workpieces 5 on the work-clamping face 35, and is fixedly secured to the work-clamping face 35 along its X-axis by means of bolts 37.

The sides of standard frame 36 each constitute one work-positioning face 38, which is equally divided along its length into individual unit work-positioning faces 38a with one end of each defined by a stopper 39.

The generally U-shaped positioning stopper 39 is removably fitted in a mating groove 40 formed in the topside of the standard frame 36, by screw 41. Work-checking face 39a projects beyond each work-positioning face 38a. It is so arranged that each of a plurality of like workpieces 5 can be precisely positioned along both X- and Y-axis when it is brought into contact with each unit work-positioning face 38a as well as the work-checking face 39a of the corresponding positioning stopper 39.

When the workpiece 5 to be set is long and narrow, the corresponding number of positioning stoppers, which are not required, may be removed.

Clamping frames 43 are located on both sides of the standard frame 36 to define work-accommodating spaces 42. Clamping frames 43 can be secured to the work-clamping face 35 with their positions freely adjustable along the Y-axis by means of bolts 46 screwed into T-nuts fitted in grooves 44 provided in the work-clamping face 35.

Each clamping frame 43 has housed therein hydraulic clamping devices 6, each located adjacent to each unit work-positioning face 38a and so arranged that a clamping block 49 connected to the tip of a piston rod 48 of its hydraulic cylinder 47 can be driven fore and back between the clamping position nearest to the unit work-positioning face 38a and the unclamping position remotest therefrom.

The hydraulic cylinders 47 are formed in the clamping frame 43, with their hydraulic oil chambers 50 interconnected by an oil path 51 by which hydraulic pressure is supplied and discharged.

The clamping block 49 is connected to the tip of the piston rod 48 by bolt 52. Its partly spherical seat of the piston rod and the clamping block 49 is urged by an elastic body 53 toward the piston rod 48 for compensation of oscillation thereof.

The hydraulic clamping device 6 may be provided as independent clamping units, but in this case the pattern of the oil path 51 tends to be complicated.

Figure 14:
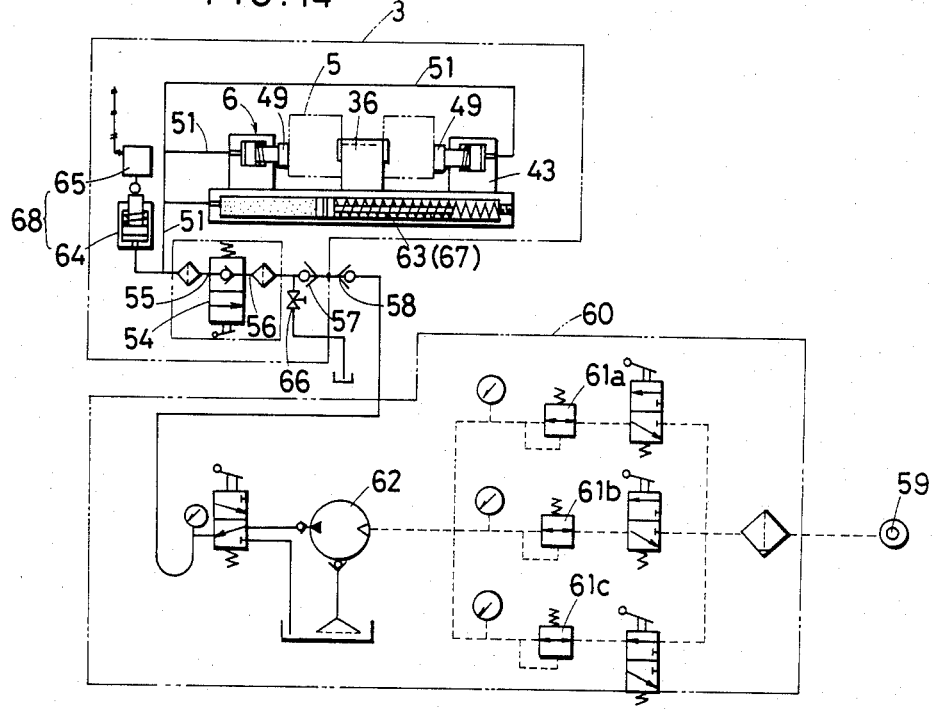
FIG. 14 is a hydraulic pressure system chart of the work-clamp pallet and hydraulic pressure supply device.

As seen from FIG. 14, the work-clamp pallet 3 is provided with a shut-off valve 54 with its secondary port 55 connected to the beginning end of the oil path 51, while a hydraulic pressure inlet 57 is located on its primary port 56 side.

The hydraulic pressure supply device 60 is installed on the pallet-changing table 2 independent of the work-clamp pallet 3 and serves to alternatively reduce the pneumatic pressure supplied from a pneumatic pressure source 59 with one of its reducing valves 61a, 61b and 61c of different set pressure levels and supply the reduced pneumatic pressure to a hydraulic pump 62 for generation of a hydraulic pressure thereby.

A hydraulic pressure outlet 58 of the hydraulic pressure supply device 60 is connected to the hydraulic pressure inlet 57 of the work-clamp pallet 3 placed at the work-changing station X on the pallet-changing table 2. This supplies the predetermined hydraulic pressure to the hydraulic clamping device 6 for each workpiece 5 to be clamped and then, after switching the shut-off valve 54 to the closed position, the hydraulic pressure outlet 58 is disconnected from the hydraulic pressure inlet 57 of the work-clamp pallet 3 and the latter (3) is then transferred onto the auxiliary table 4A for machining of the workpieces thereon.

In order to facilitate connection of the hydraulic pressure outlet 58 of the hydraulic pressure supply device 60 to the hydraulic pressure inlet 57 of the work-clamp pallet 3, as well as disconnection therefrom, it is advisable to design the hydraulic pressure inlet 57 as a joint of a self-seal coupling.

In FIG. 14 reference numeral 67 denotes a spring-type accumulator of a device 63, 64, 65 to prevent the decline hydraulic pressure. The device includes an actuator of a hydraulic pressure abnormal decline detection device 68 and a limit switch on the machine tool side respectively and 66 a stop valve for releasing pressure.

As seen in FIGS. 14–26, the shut-off valve 54 is a seat valve of 2-port, 2-position changeover type having its valve body 69 fixedly secured to the base block 20 by the use of bolts 70A. On the primary port 56 side of shut-off valve 54 is provided the hydraulic pressure inlet 57 facing the outside of the valve body 69. This hydraulic pressure inlet 57 is designed as a joint of a self-seal coupling, to which the hydraulic pressure outlet 58 of the hydraulic pressure supply device 60 is disconnectably connected.

The secondary port 55 of the shut-off valve 54 is connected to the beginning end of the oil path 51 in the base plate 20. This oil path 51 opens in both end faces of the base block 20 and is connected to each clamping frame 43 via hydraulic hose 51a. (See FIG. 11)

A valve core 71 in a valve chamber 70 of the shut-off valve 54 is urged by a compression spring 72 toward a valve seat 73, to prevent the back flow of hydraulic oil from the secondary port 55 side to the primary port 56 side.

A seating face 71a of the valve core 71 is formed as an annular member 74 of a synthetic resin having excellent abrasion resistance and mechanical strength. The valve seat 73 is formed as an annular raised portion projecting toward the valve chamber 70 side, hence the seating face 71a of the valve core 71 contacts the valve seat 73 perfectly gap-free for secure shutting-off of a hydraulic pressure as high as approx. 250 kg/cm$^2$G for a substantial period of time.

When hydraulic pressure is to be supplied to the clamping device 6, this valve is opened against the force of the spring 72. The valve is, however, also required to be opened for discharge of hydraulic pressure therethrough when clamping force is to be relieved for changing workpieces 5, hence there is provided the following valve-opening means.

One end of a valve opening rod 75 disposed in the primary port 56 is in contact with or close to the valve core 71. The other end of the valve opening rod 75 is disposed on an inclined cam face 77 of a cam shaft 76. When the cam shaft 76 is turned by approx. 60° counter-clockwise by means of a control lever 78 (FIG. 16), the valve opening rod 75 is pushed by the inclined cam face 77 toward the valve chamber 70 for the valve to be opened. The valve is closed by reversal of the above procedure (FIG. 15).

The extent of rotation of the cam shaft 76 is limited by means of a rotation limiter 79 which comes into contact with a rotation limiting face 80 of the cam shaft 76.

Also, when the valve is open, a locking means 81 which is formed as a steel ball is fitted in a recess 82 on one side of the cam shaft 76, (it is fitted in the recess 82 on the other side of the cam shaft 76 when the valve is closed) so that the cam shaft 76 is locked in either of both valve positions.

Reference numeral 83 denotes a wire mesh filter, 66 a stop valve for releasing pressure and 78a is a hole provided for mounting the control lever 78.

A valve opening means of the electromagnetic type or of the hydraulic type may be used instead of the structure described above.

Shut-off valve 54 can have constructions other than that described above, but in every case it should be highly durable and extremely small in the amount of leakage of hydraulic pressure.

The work-clamp pallet 3 of the present invention is unique in that it can have workpieces 5 positioned and clamped thereon at the work-changing station X which may be provided in a part of the shop away from the machine tool 1. The assembly can be transferred to where the workpieces 5 are machined with the oil path 51 therein completely closed by means of the above-mentioned shut-off valve 54 so as to hold the workpieces without the necessity of supplementing the hydraulic pressure.

The hydraulic pressure in the hydraulic clamping device 6 is required to be kept above the set level for a long time, i.e. from setting of workpieces 5 on the pallet 3 to completion of machining thereof.

In order to prevent hydraulic pressure leakage from the hydraulic cylinder 47 of the clamping device 6 as well as fall and/or rise of hydraulic pressure due to variation of the oil temperature, the base block 20 is provided with the following hydraulic pressure decline preventing device 63 and hydraulic pressure abnormal decline detection device 68.

The spring-type accumulator 67 utilized as the hydraulic pressure decline preventing device 63 is provided in the base block 20. Its pressure accumulating oil chamber 84 is connected with the oil path 51 by means of hydraulic hose etc. (FIGS. 11 and 19)

This spring-type accumulator 67 has piston 86 urged into chamber 84 by a compression coil spring 87, the spring force being balanced with the hydraulic force when the hydraulic pressure is at the set level.

If the hydraulic pressure starts falling, the piston 86 is urged by the spring 87 into the pressure accumulating oil chamber 84 so as to exert a compression force on the hydraulic oil and prevent the decline of the hydraulic pressure.

Conversely, if the hydraulic pressure starts rising due to expansion of the hydraulic oil caused by a rise in the oil temperature, the piston 86 retracts against the force of the spring 87 and an abnormal increase in the hydraulic pressure is thus prevented.

The hydraulic pressure abnormal decline detection device 68 is composed of the actuator 64 provided on the base block 20 and the limit switch 65 installed on the table 4 side of the machine tool 1.

It is so arranged that the actuator 64 uses the hydraulic pressure in the hydraulic oil chamber 88, communicating with the oil path 51 in the base block 20, to push the piston 89 outwardly. Piston 89 is urged inwardly by a compression spring 90 for setting the hydraulic pressure at which the piston 89 is moved outwardly. When the hydraulic pressure is at the set level, the hydraulic pressure is roughly balanced with the spring force with the piston 89 kept at the position corresponding to the normal hydraulic pressure as illustrated.

When the hydraulic pressure in the hydraulic oil chamber 88 has fallen below the set level, the piston 89 is displaced inwardly by the spring force to the position for detection of abnormal hydraulic pressure.

The displacement of the piston 89 is detected by the limit switch 65 and the signal output thereof is transmitted to a control device (not shown) of the machine tool 1 and the latter is emergency-stopped in the event of any abnormal decline of the hydraulic pressure.

Reference numeral 91 denotes a spring holder which is locked by a fastener 92 after proper setting of the length of the spring 90.

Reference numeral 93 is a means provided for keeping constant the positional relation between the actuator 64 and the limit switch 65.

If it is necessary to adjust the clamping force of the clamping device 6 according to the material, shape and size of the workpieces 5, an actuator 64A as illustrated in FIG. 20 may be used for adjusting the level of the hydraulic pressure.

The length of the spring 90A can be rapidly adjusted by turning the spring holder 91A by means of the control lever 78A. The length of spring corresponding to each hydraulic pressure set level is readable from a dial 94.

Figure 24:
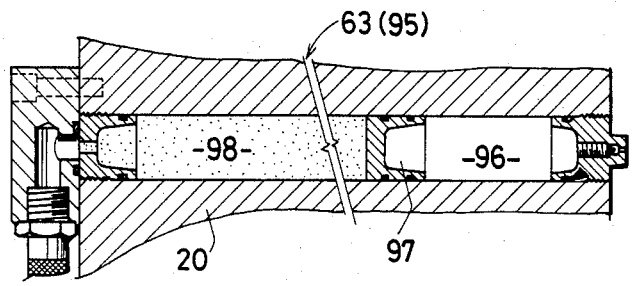
FIG. 24 is a horizontal sectional plan view of a piston type accumulator.
Figure 25:
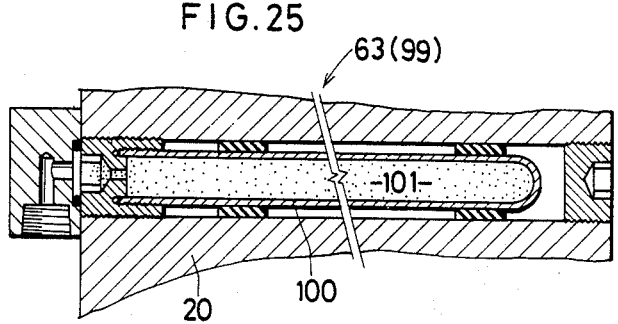
FIG. 25 is a horizontal sectional plan view of an elastic tube type accumulator.
Figure 26:
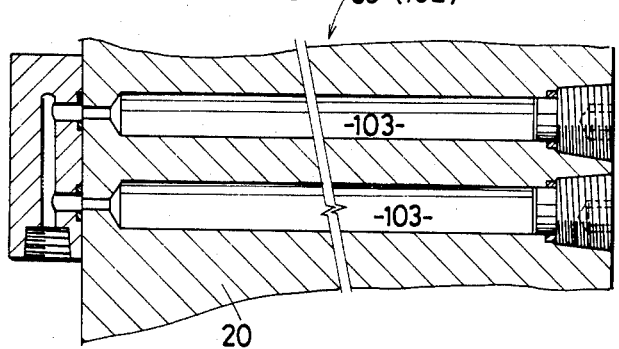
FIG. 26 is a horizontal sectional plan view of a hydraulic oil dwelling type accumulator.

A number of other modifications of the actuator are shown in FIGS. 21–23, and 3 modifications of the hydraulic pressure decline preventing device are shown in FIGS. 24–26.

The piston-type accumulator 95 (FIG. 24) is made to push a piston 97 by the pressure of the compressed nitrogen gas in a compression chamber 96 so as to prevent decline of the hydraulic pressure in a pressure accumulating oil chamber 98.

The elastic tube-type accumulator 99 (FIG. 25) is made to use the resiliency of an elastic tube made of steel or a rubber compound material for compressing the hydraulic oil in a pressure accumulating oil chamber 101 so as to ensure against fall of the hydraulic pressure.

The accumulator of the hydraulic oil dwelling type 102 (FIG. 26) is made to utilize the elastic volume strain of the large amount of hydraulic oil in a hydraulic oil chamber 103 for preventing fall of the hydraulic pressure.

The oil pressure decline preventing device 63 as exemplified above can be built in the base block 20 with no spece requirement on the surface thereof. It is even possible to provide a plurality of accumulators in a single base block 20.

When the oil temperature is subject to marked changes due to variation of the atmospheric temperature in the shop etc., it is advisable to use the spring-type accumulator 67.

FIGS. 27–41 show a number of alternative embodiments with partial modifications of the principal embodiment of the present invention already described.

Figure 27:
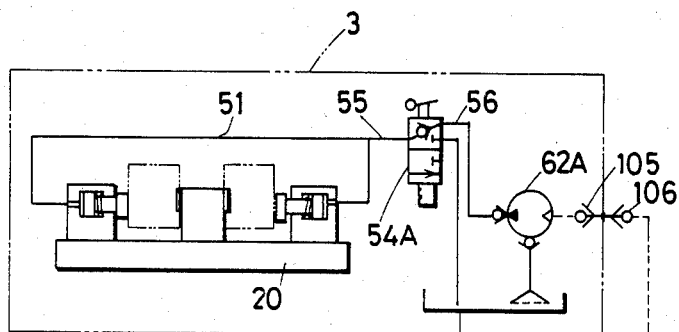
FIG. 27 is a hydraulic pressure system chart for the work-clamp pallet in a first alternative embodiment.

I. A first alternative embodiment is shown in FIGS. 27 and 28.

In this alternative embodiment the base block 20 is provided with a hydraulic pressure supply device composed of a small pneumatically-driven hydraulic pump 62A which operates on the supplied pneumatic pressure to generate a hydraulic pressure. An oil tank 104, and its air inlet 105 is adapted to be disconnectably connected with an air outlet 106 of a separate compressed air supply device (not shown). In this embodiment the hydraulic pressure inlet is connected permanently with the hydraulic pressure outlet of the hydraulic pressure source.

Figure 28:
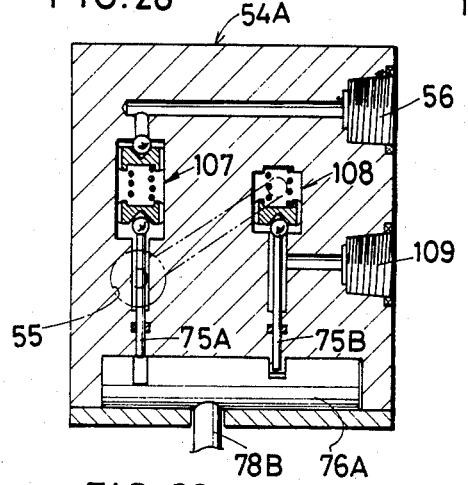
FIG. 28 is a vertical sectional side view of the shut-off valve of FIG. 27.

As a shut-off valve, it is possible to use a seat valve of 3-port, 2-position changeover type 54A shown in FIG. 28.

This shut-off valve 54A is made up of an oil supply valve 107 disposed between the primary port 56 and the secondary port 55 and an oil drain valve 108 disposed between the secondary port 55 and the oil drain port 109. As shown in the figure the valve is open for supplying hydraulic oil. For draining hydraulic oil, a cam shaft 76A is turned by means of a control lever 78B to enable valve opening rod 75A to be pushed down to close the oil supply valve 107. Simultaneously, the other valve opening rod 75B is pushed up to open the oil drain valve 108 for the hydraulic oil to be drained through the secondary port 55 and the oil drain port 109.

Figure 29:
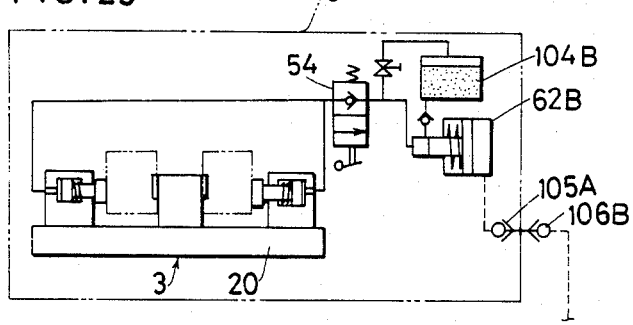
FIG. 29 is a hydraulic pressure system chart for the work-clamp pallet in a second alternative embodiment.

II. A second alternative embodiment is shown in FIG. 29.

In this alternative embodiment the base block 20 is provided with a hydraulic pressure supply device composed of a small, continuously operable booster 62B which operates on the supplied pneumatic pressure to generate the hydraulic pressure in conjunction with oil tank 104B. Air inlet 105A of the booster 62B is adapted to be disconnectably connected with an air outlet 106B of a separate compressed air supply device (not shown).

Figure 30:
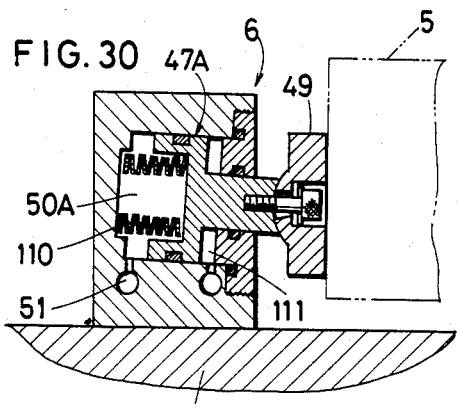
FIG. 30 is a vertical sectional side view of the hydraulic clamping device in a third alternative embodiment.

III. A third alternative embodiment is shown in FIG. 30.

In this alternative embodiment a Belleville type disc spring 110 is set in a hydraulic oil chamber 50A of an hydraulic cylinder 47A of clamping device 6 so that the workpiece 5 can be clamped tentatively by spring force.

When the workpiece 5 is to be set, first the disc spring 110 is compressed by the hydraulic pressure in a backstroke oil chamber 111 and, after setting the workpiece 5, the hydraulic pressure is released thereby allowing the workpiece 5 to be tentatively clamped lightly by the spring force of disc spring 110. Then, after final, precise positioning of the workpiece 5, hydraulic pressure is supplied to a hydraulic oil chamber 50A for clamping the workpiece 5.

Figure 31:
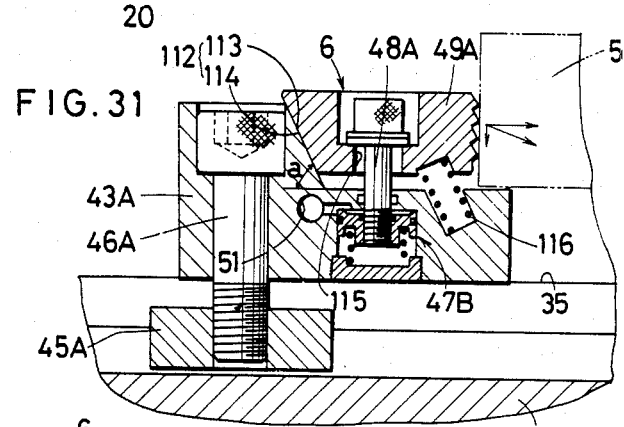
FIG. 31 is a vertical sectional side view of the hydraulic clamping device in a fourth alternative embodiment.

IV. A fourth alternative embodiment is shown in FIG. 31.

In this alternative embodiment, the hydraulic clamping device 6 compresses a hydraulic cylinder 47B of vertical type provided in a clamping frame 43A and is arranged to drive a clamping block 49A forward and back through a slide-wedge mechanism 112.

The clamping frame 43A is fixedly secured to the work-clamping face 35 means of bolts 46A and T-nuts 45A such that its position is freely adjustable.

The slide-wedge mechanism 112 is made up of an inclined cam face 113 on the clamping frame 43A and a mating driven inclined face 114 on the clamping block 49A in sliding contact therewith when the clamping block 49A is pulled down by piston rod 48A of the hydraulic cylinder 47B, the resulting downward force is approximately redoubled and the clamping block 49A is driven thereby to clamp the workpiece 5.

The force-amplifying ratio increases with increasing angle of inclination "a" of the inclined cam face 113, but it is advisable to set this angle at approximately 60°–75°.

Reference numeral 116 denotes a compression spring for bringing the clamping block 49A into contact with the cam face 113 and 51 an oil path.

Figure 32:
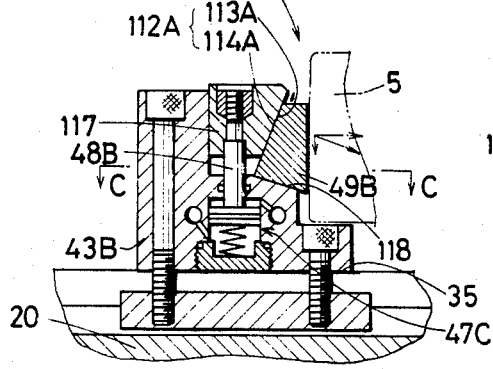
FIG. 32 is a vertical sectional side view of the hydraulic clamping device in a fifth alternative embodiment.
Figure 33:
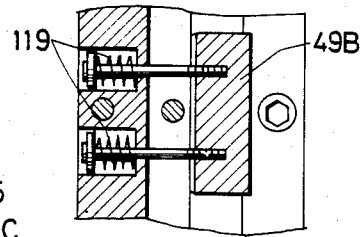
FIG. 33 is a sectional view taken along the line C—C in FIG. 32.
Figure 34:
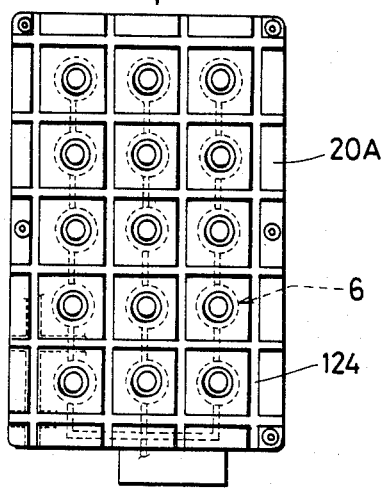
Figure 35:
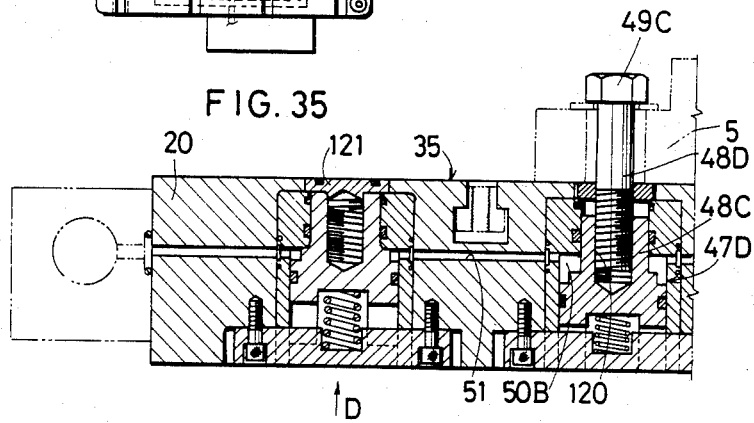

V. A fifth alternative embodiment is shown in FIGS. 32 and 33.

In this alternative embodiment the hydraulic clamping device 6 consists of a slide-wedge mechanism in 112A similar to that of the fourth alternative embodiment and means to drive a clamping block 49B forward and back with respect to the workpiece 5.

The slide-wedge mechanism 112A has a wedge block 117 arranged to be vertically driven by a piston rod 48B of a hydraulic cylinder 47C inserted between a clamping frame 43B and a clamping block 49B. When wedge block 117 is pulled down by the hydraulic cylinder 47C, the clamping block 49B is driven through a driven inclined face 114A in sliding contact with an inclined cam face 113A of the wedge block 117 to clamp the workpiece 5. Since the clamping block 49B slides along an inclined bearing face 118 as it is driven, there is also produced a downward component of the clamping force.

There is provided a pulling means 119 for pulling the clamping block 49B against the wedge block 117. This precludes any gap between the individual sliding components so that there is no risk of cutting chips being engaged therebetween and an excellent durability of the mechanism is ensured.

VI. A sixth alternative embodiment is shown in FIGS. 34–39.

In this alternative embodiment a work-clamp pallet 3A is intended for use with a vertical machine tool. Its base block 20A is made of a thick steel plate formed with a large number of vertical hydraulic cylinders 47D arranged longitudinally as well as laterally at an approximately equal pitch for clamping workpieces 5 on its work-clamping face 35.

A piston rod 48C of each hydraulic cylinder 47D is vertically movable under the work-clamping face 35, and has a tapped hole 120 in its top end face.

One end of an auxiliary (extension) piston rod 48D is screwed into this tapped hole 120. A clamping block 49C formed at the head of the auxiliary piston rod 48D is applied to the workpiece 5 and then hydraulic pressure is supplied from the oil path 51 to a hydraulic oil chamber 50B for clamping the workpiece 5 with the clamping block 49C.

When the clamping devices 6 are located away from or right under the workpiece 5, a plug 121 may be screwed in the abovementioned tapped hole and the piston rod 48C is kept locked at the upper end of its stroke.

Figure 36:
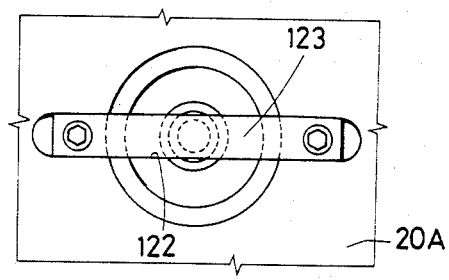

The piston rod 48C of the hydraulic cylinder 47D is checked against rotation by means of a rotation inhibitor 123 fitted in a mating groove 122 in the lower part thereof. (FIG. 36)

The beginning end of the oil path 51 communicating the hydraulic oil chambers 50B of the hydraulic cylinders 47D is connected with the secondary port of the shut-off valve.

In the work-clamping face 35 there are provided T-sectioned or square-sectioned grooves 124 along X-as well as Y-axis, which in combination with square-sectioned members or the like fitted therein facilitate positioning of the workpieces 5.

As an alternative embodiment of the above-mentioned hydraulic cylinder 47D a simplified hydraulic cylinder is shown in FIG. 37. In the figure reference numeral 121A denotes a fixed plug used for positioning of a workpiece 5 having a round hole in it.

As shown in FIG. 38, another alternative is possible, wherein each workpiece 5 is held lifted by the use of a supporting block 125 as it is positioned by positioning means 126. The positioned workpiece 5 is clamped by a clamping block 49D connected to the upper end of the auxiliary piston rod 48D of the hydraulic cylinder 47D.

In the embodiment shown in FIG. 39, the auxiliary piston rod 48D of the hydraulic cylinder 47D is used to clamp a standard frame 36A in place. Clamping device 6 is provided across the work accomodating space 42 from this standard frame 36A.

This clamping device 6 has means to drive a clamping block 49E forward and back through the slide-wedge mechanism 112 described in connection with the fourth alternative embodiment.

In this embodiment the individual clamping blocks 49E are provided on a clamping frame 43C common for a plurality of clamping devices 6 or independent counterparts so that clamping is effected by the clamping block 49E when the auxiliary piston rod 48D is driven downwardly.

Clamping the workpiece 5 in a lifted position as mentioned above enables various machining operations such as boring to be accomplished.

The use of the slide-wedge mechanism 112 which increases or multiplies the clamping of the work 5 or miniaturization of the hydraulic cylinder 47D.

It also produces a downward component as it works, hence its use is advantageous in clamping a flat workpiece 5.

VII. A seventh alternative embodiment is shown in FIGS. 40–41.

A work-clamp pallet 3B in this alternative embodiment is intended for use with a horizontal machine tool.

Its base block 20B is formed as a box-like steel frame whose 4 sides each constitute one work-clamping face 35, on which are provided a plurality of hydraulic clamping devices 6.

Figure 40:
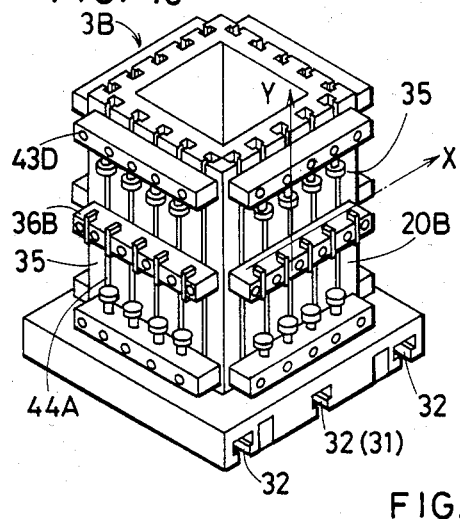
FIG. 40 is a perspective view of the work-clamp pallet in a seventh alternative embodiment.
Figure 41:
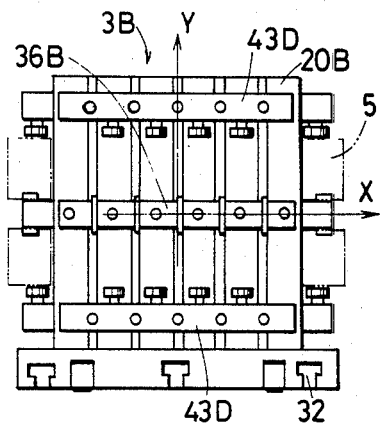
FIG. 41 is the front view corresponding to FIG. 40.

With the center of each work-clamping face 35 X and Y axes are oriented as illustrated in FIGS. 40 and 41.

Each standard frame 36B as well as each clamping frame 43D is removably secured in place with bolts screwed into T-nuts disposed in T-sectioned grooves.

When a large-sized workpiece 5 is to be clamped on the work-clamping face 35, it is possible to remove all the abovementioned standard frames 36B and clamping frames 43D and clamp the workpiece 5 with bolts and T-nuts set in T-sectioned grooves 44A as in the case of a conventional work-clamp pallet.

Fairly large-sized workpieces 5 can be clamped when the standard frame 36B is shifted toward either clamping frame 43D.

The standard frame 36B and the clamping device 6 in this alternative embodiment are essentially the same as described above in connection with the principal embodiment, but it is also possible to use any of those shown in the above alternative embodiments.

The base block 20B is further provided on or in its underside with the clamping means 32 consisting of T-sectioned grooves, positioning means consisting of a pair of engaging holes, castor means set in the square-sectioned groove provided therein.

As the clamping means 32, however, a number of alternatives are possible, besides the one described above. It is, for instance, also possible to clamp the base block 20B on the work table 4 or auxiliary table 4A of a machine tool.

It is also possible to use as the positioning means a number of alternatives, besides the one described above.

The shut-off valves, hydraulic hoses etc. in this alternative embodiment are not shown in the figures.

Figure 42:
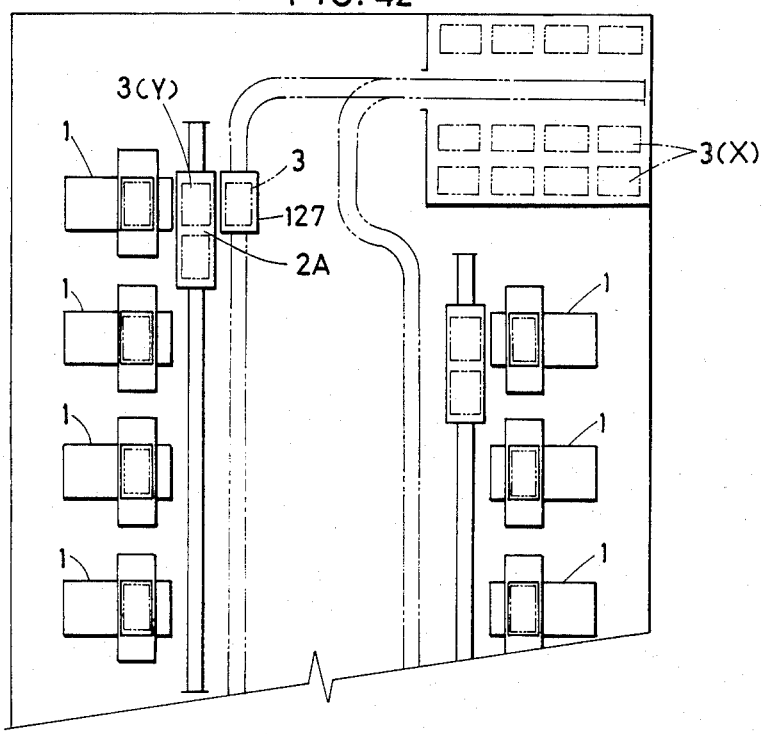
FIG. 42 is a layout of a shop having in it modified pallet-changing tables and a work-changing station in an eighth alternative embodiment.

VIII. A eighth alternative embodiment is shown in FIG. 42.

In this alternative embodiment a plurality of machine tools 1 are installed in parallel and in front of each is placed a pallet-changing table transferable linearly or sideways.

At a work-changing station X located somewhere in the shop the work-clamp pallets 3 are readied one after another by changing workpieces 5 thereon. As each work-clamp pallet 3 is readied (with new workpieces 5) it is transferred by mobile trailer 127 to one of the pallet-changing tables 2A. After transfer to pallet-changing table 2A the "new" and "old" work-clamp pallets 3 are exchanged. A shop layout as shown in the figure is possible for use with the work-clamp pallet 3, 3A or 3B of the present invention. It is possible to shut down the oil path 51 of the hydraulic clamping devices 6 by means of the shut-off valve 54 or 54A and to transfer it with the hydraulic pressure therein maintained so as to clamp the workpieces 5 thereon.

I claim:

1. A work clamp pallet for a machine tool comprising:
   a. a base block having means on a lower surface for attachment to a bed of a machine tool;
   b. a plurality of hydraulically activated work clamping devices attached to the base block such that a plurality of workpieces may be mounted on the base block;
   c. hydraulic fluid conduit means attached to the base block and interconnecting the work clamping devices;
   d. a hydraulic fluid pressure source;
   e. self-sealing coupling means for attaching the hydraulic fluid pressure source to the fluid conduit means; and,
   f. a shut-off valve attached to the base block and interposed between the self-sealing coupling means and the fluid conduit means, the valve having:
      i. a valve core element biased against a valve seat to close the valve and prevent decline of the hydraulic fluid pressure in the work clamping devices and the fluid conduit means;
      ii. valve operating means to move the valve core element against the spring bias away from the valve seat to open the valve and permit fluid to flow through the self-sealing coupling; and,
      iii. auxiliary valve means located between the valve seat and the self-sealing coupling to release the hydraulic fluid pressure in the shut-off valve.

2. The work clamp pallet according to claim 1 wherein the machine tool has a limit switch device connected to indicator means thereon and further comprising: hydraulic pressure level detection means attached to the base block and contacting the limit switch when the base block is attached to the bed of the machine tool, and communicating with the hydraulic fluid conduit means such that, when the hydraulic fluid pressure drops below a predetermined value, the limit switch means is activated.

3. The work clamp pallet according to claim 2 wherein the hydraulic pressure level detection means comprises:
   a. a housing attached to the base block and defining a hydraulic chamber which communicates with the hydraulic fluid conduit means;
   b. piston means slidably retained in the hydraulic chamber and having a rod portion extending exteriorly of the housing to contact the limit switch means; and,
   c. spring means biasing the piston means toward an end of the hydraulic chamber.

4. The work clamp pallet according to claim 3 further comprising adjusting means connected to the housing and the piston means to adjust the amount of the rod portion which extends exteriorly of the housing.

5. The work clamp pallet according to claim 4 further comprising indicia means on the adjusting means to indicate the amount of the rod portion which extends exteriorly of the housing.

6. The work clamp pallet according to claim 2 wherein the valve operating means comprises:
   a. a cam element rotatably mounted in the valve structure so as to be manually rotatable between first and second positions; and,
   b. a valve opening rod slidably mounted in the valve structure and having a first end bearing against the valve core element and a second end bearing against the cam element such that, upon rotation of the cam element from a first to a second position, the valve core element is displaced away from the valve seat against the spring bias to open the valve.

7. The work clamp pallet according to claim 2 further comprising hydraulic accumulator means attached to the base block and communicating with the hydraulic fluid conduit means so as to maintain the hydraulic pressure in the work clamping devices and the fluid conduit means when the shut-off valve is in its closed position.

8. The work clamp pallet according to claim 7 wherein the hydraulic accumulator means comprises:
   a. accumulator piston means slidably retained in a bore in the base block, one end of the bore communicating with the hydraulic fluid conduit means; and,
   b. spring means biasing the piston toward the one end of the bore so as to maintain a predetermined pressure in the hydraulic fluid.

9. The work clamp pallet according to claim 7 wherein the hydraulic accumulator means comprises:
   a. an accumulator piston slidably disposed in a bore defined by the base block, one end of the bore communicating with the hydraulic fluid conduit means; and
   b. a pressurized gas in the bore between the accumulator piston and a second end of the bore biasing the piston towards the one end so as to maintain a predetermined pressure in the hydraulic fluid.

10. The work clamp pallet according to claim 9 wherein the pressurized gas is nitrogen.

11. The work clamp pallet according to claim 7 wherein the hydraulic accumulator means comprises a resilient elastic tube disposed in a bore in the base block such that one end of the tube and the bore communicates with the hydraulic fluid conduit means to allow hydraulic fluid to enter the interior of the tube, the resiliency of the tube maintaining a predetermined pressure in the hydraulic fluid.

12. The work clamp pallet according to claim 2 wherein the source of hydraulic fluid pressure is mounted on the base block.

13. The work clamp pallet according to claim 12 wherein the source of hydraulic fluid pressure comprises a pneumatically driven hydraulic pump.

14. The work clamp pallet according to claim 12 wherein the source of hydraulic fluid pressure comprises a pneumatically actuated pressure booster.

15. The work clamp pallet according to claim 2 wherein the base block comprises: a machine tool mounting portion having means thereon to attach the base block to a bed of a machine tool; and, a work mounting portion having a plurality of hydraulically actuated clamping devices thereon, the axes of the clamping devices extending generally perpendicular to the machine tool mounting portion.

* * * * *